March 7, 1961 G. P. KENNEDY 2,973,779
VAPOR BY-PASS VALVE
Filed Dec. 14, 1956 2 Sheets-Sheet 1
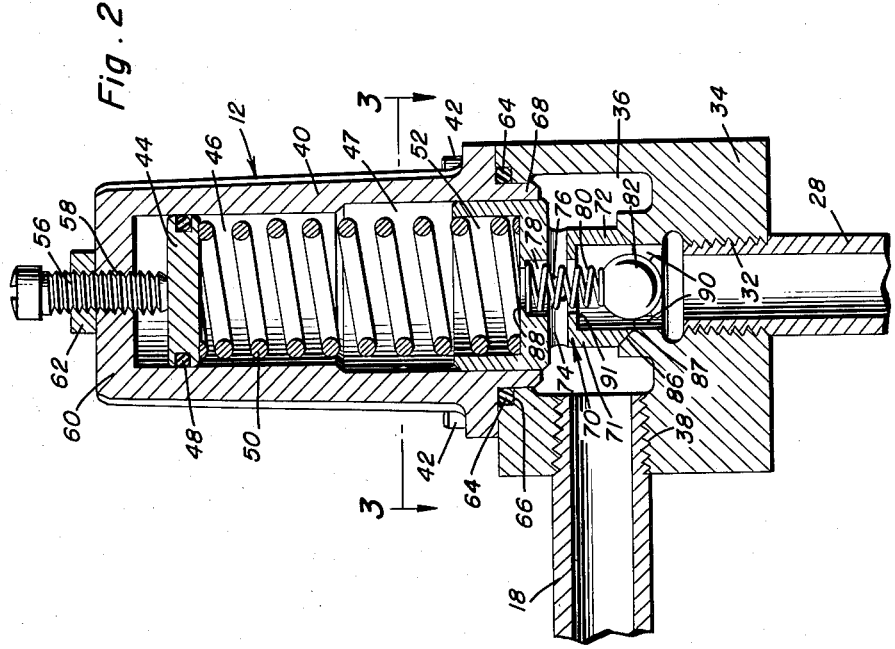
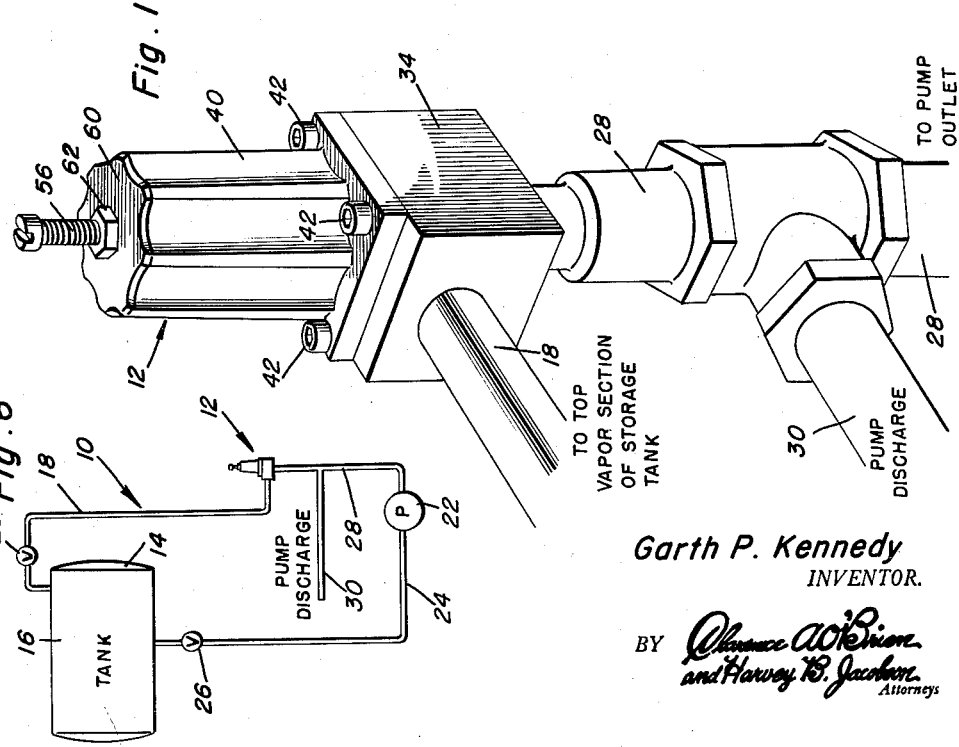
Garth P. Kennedy
INVENTOR.

March 7, 1961  G. P. KENNEDY  2,973,779
VAPOR BY-PASS VALVE
Filed Dec. 14, 1956  2 Sheets-Sheet 2
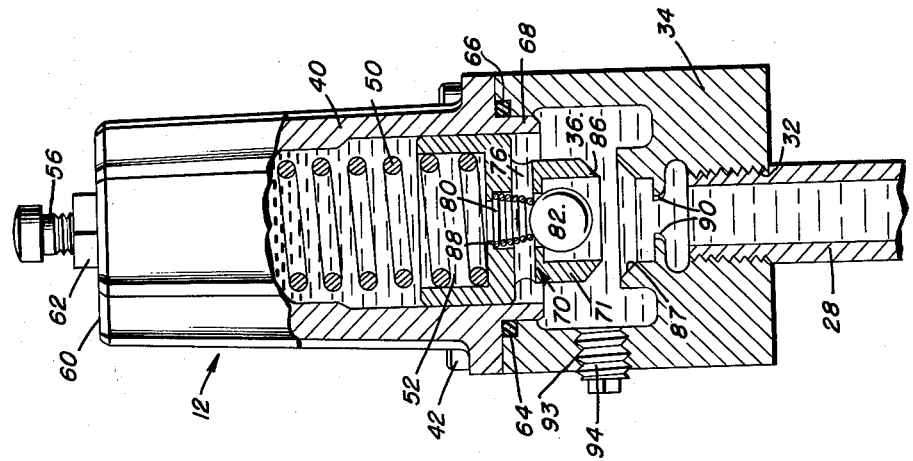
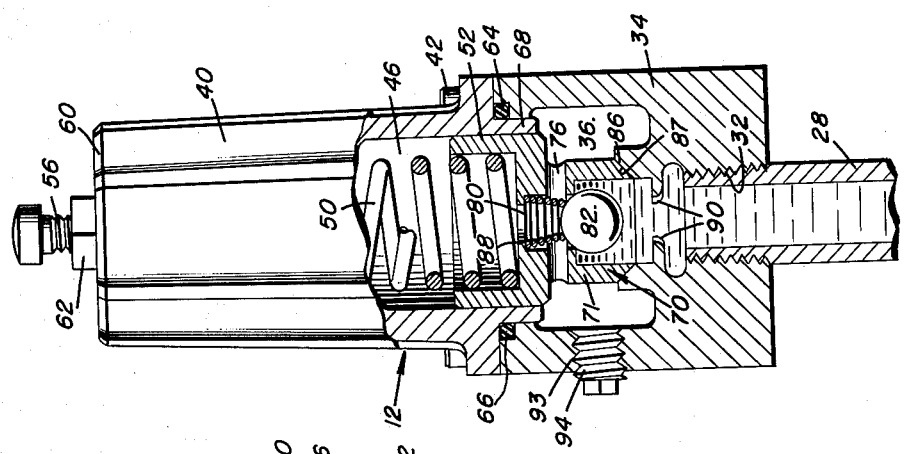
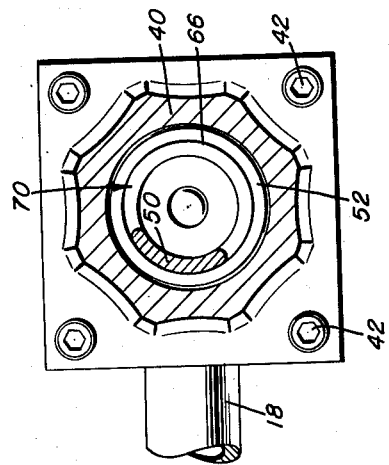
Garth P. Kennedy
INVENTOR.

United States Patent Office 2,973,779
Patented Mar. 7, 1961

2,973,779

VAPOR BY-PASS VALVE

Garth P. Kennedy, Oklahoma City, Okla., assignor to Corken's, Inc., Oklahoma City, Okla., a corporation of Oklahoma Filed Dec. 14, 1956, Ser. No. 628,266

5 Claims. (Cl. 137—512.1)

This invention relates to a valve which has two main functions, one being as a relief valve and the other as a priming valve to keep the pump with which it is operatively associated primed at all times.

An object of the invention is to provide a valve used in connection with a liquid pump and so constructed that the pump is kept free from vapor because the valve will open automatically to admit fluid from a supply tank in a storage facility with which the valve is associated. When the pump is not running or if the pump should vapor-lock while running, the valve will automatically adjust itself to open, thereby alleviating the vapor-lock difficulty.

When the valve is subject to normal pumping operation, a by-pass feature is closed so that all of the liquid being discharged from the pump goes to the point of use. But, if at that point there is a restriction in a line, for example, a closed valve, increasing the pressure against the pump, then the differential relief function of the valve comes into operation, opening and relieving liquid so that it will flow back into the supply tank. When the pressure is dropped to normal operating level, the valve automatically closes, that is, it becomes adjusted to such position that it is capable of functioning to permit normal pump operation.

Although the principal, but not exclusive, application of the valve which is constructed in accordance with the invention is in connection with a petroleum bulk storage facility, there are many other applications for the valve. The suggested installation in a bulk storage facility would have the pump outlet connected with the inlet of the valve body, with the pump discharge in between the pump outlet and the liquid inlet in the valve body. There is an opening in the valve body with which a vapor line is connected, this vapor line extending to the top vapor section of the storage tank. A multiple valve assembly is located in the valve body, there being a main valve which is yieldingly biased by a spring to the closed position, together with a valve element that is normally retained open by spring pressure. During normal operating conditions the main valve remains closed and the valve element is pushed to the closed position by the pump discharge pressure. This means that the pump will then function to deliver liquid from the supply tank through the pump discharge without passing through the valve body. But, should the back pressure in the pump discharge line exceed a value which is adjustable in the valve, the main valve will open, allowing some or all of the liquid to by-pass through the valve body and return to the storage tank. The final operating condition of the valve is when the pump has been shut down, at which time the main valve closes and the valve element carried by the main valve opens. If installed as suggested, the vapor and/or liquid in the system is capable of flowing from the tank through the valve body and pump until the liquid seeks its level. Inasmuch as a pump in a system such as this is ordinarily mounted below the liquid level in the tank, the liquid will flow through the pump, thereby priming the pump automatically and preparing it for subsequent operation.

Accordingly, it is a further object of the present invention to provide a valve which is capable of functioning as described above, the valve being both quick and rapid in its operation and responsive to various operating conditions that are ordinarily encountered in handling liquid in bulk storage facilities.

Some of the inherent features of the invention are embodied in a valve which does not chatter, is simple to install either in a vertical or horizontal position, and which automatically eliminates the age old problem of priming the pump and vapor locking. When the pump is shut down or vapor locked, the priming feature of the valve will be automatically called into play and release the vapor that has built up in the pump and the inlet line that feeds the pump. When the pump picks up liquid, the priming automatically discontinues in the valve inasmuch as it is unnecessary any longer. Moreover, the valve is so constructed that it acts as a differential relief valve when the pump is forced to develop its maximum pressure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a valve which is constructed in accordance with the invention;

Figure 2 is a longitudinal sectional view of the valve in Figure 1, showing the valve in the condition as would occur when the pump is idle, noting that the main valve is closed and the ball valve carried by the main valve is open;

Figure 3 is a transverse sectional view taken on the line 3—3 of Figure 2;

Figure 4 is an elevational view with parts shown in section, showing the adjustment of the valve when the pump is in normal operation, that is, the main valve is still closed, but the spring-loaded ball valve element carried by the main valve is pushed to the closed position by the discharge pressure of the pump;

Figure 5 is an elevational view with parts shown in section, this view illustrating the condition of the valve when the pump has reached its maximum discharge pressure and the valve is by-passing all of the discharge back to the storage tank, it being observed that the main valve is open and the ball valve element carried by the main valve is pushed to the closed, but ineffectual position; and Figure 6 is a schematic and fragmentary view of a petroleum bulk storage facility wherein a valve constructed in accordance with the invention is installed.

In the accompanying drawings there is a bulk storage facility 10 which is fragmentarily shown, it being understood that only enough of the facility is illustrated to identify the suggested disposition of valve 12 in such a system. The facility includes an ordinary storage tank 14 that has a top vapor section 16 with which vapor line 18 is connected. Valve 20 controls the passage of liquid and/or vapor through vapor line 18. Pump 22 is installed below tank 14, as is valve 12. The pump has a feed conduit 24 connected to its inlet port or manifold and valve 26 controls admission of liquid from the bottom of tank 14 to the pump 22. The outlet port of pump 22 has a line 28 connected with it, there being a pump discharge line 30 connected with line 28 in between pump 22 and valve 12. Line 28 is threaded or otherwise connected with the inlet 32 formed in valve body 34 of valve 12. The ordinary flow pattern (Figure 6) is for pump 22 to draw liquid from tank 14 and expel it through the pump discharge 30 to a point of use or application. Valve 12 exercises control functions over the system, both modulating the flow when necessary and being certain that the pump operates effectively and efficiently.

Attention is now invited principally to Figures 1–3 where the construction of the valve 12 is shown in detail. Valve body 34 is in the form of a block which has a valve chamber 36. Vapor line 18 is threaded in bore 38, the latter being in registry with chamber 36 and spaced from the liquid inlet 32 by means of the valve chamber 36. Bonnet 40 is bolted, as at 42, on one surface of the valve body 34, the bolts 42 passing through holes in a flange at one end of the valve bonnet and into tapped openings (not shown) in the valve body 34. Sliding seal 44 is disposed in the bore 46 in bonnet 40 and has an O-ring 48 or other wiper carried by it and contacting the walls of bore 46. Spring 50 is seated at one end on seal 44 and seated at the other end within cup or piston 52 formed in valve 70. There are means to adjust the bias of spring 50, these means preferably being a screw 56 passed through threaded bore 58 in the valve bonnet upper wall 60 and held in place by a lock nut 62. A seal, for example, compressible ring 64, is mounted in a recess 66 formed in the valve body 34 and in the surface that accommodates the flange of the bonnet 40. Annular skirt 68 formed at the lower extremity of bonnet 40 fits down into the upper part of the chamber 36 so that the bonnet fits firmly and in proper alignment with the remainder of the valve body.

The main valve 70 is made of a main valve body 71 that has the previously mentioned cup 52 at one end and a smaller diameter cup or piston 72 at the opposite end and in axial alignment with the cup 52. Transverse, intersecting passages 74 and 76 are in the main valve body 71 and they are in registry with the longitudinal passage 78 which interconnects the cups 52 and 72. The side wall of cup 52 is fitted in the lower enlarged parts 47 of bore 46, while the side wall of the smaller cup 72 is contained within the chamber 36. Passage 78 is in axial alignment with the inlet 32 and accommodates a spring 80 which is of a smaller constant than spring 50, spring 80 being much weaker. Spring 80 has one end seated on an inwardly directed flange 88 at the end of passage 78 and has its opposite end reacting on the valve element 82 which in this case is a ball. Inasmuch as the passages 74, 76 and 78 interconnect the chamber 36 with the inlet 32, this group of passages is considered to be a passageway and it is controlled by the valve element 82. The bias of spring 80 is in such direction as to maintain the valve element in the unseated or open position.

The end of cup 72 has a beveled wall or seating surface 86 which is normally at rest on the similarly beveled valve seat 84, the latter being concentrically arranged with the inlet 32. Spring 50 then normally holds the main valve closed so that the valve is disposed on its seat 87. At the same time spring 80 maintains the valve element 82 resiliently pressed against the inwardly directed shoulders 90 that are formed in the inner part of the inlet 32. The lower extremity of passage 78 has valve seat 91 formed thereon and on which the valve element 82 is adapted to be disposed.

As shown in Figure 6, there is a single vapor line 18 connected with the valve body. However, to accommodate a larger number of such lines or other additional lines, adequate provision may be made, such as the threaded openings 93 which accommodate plugs 94 until such time that they are needed. It is a simple matter to remove plugs 94 in order to use the openings in the valve body which lend access to the interior of the valve.

Reference is now made principally to Figure 2 showing a condition in the system of Figure 6 or an analogous system wherein the pump 22 is idle. The main valve 70 is closed and the valve element 82 is open. These are the normal positions for the valve 70 and for the valve element 82. Accordingly, liquid is free to flow by gravity from the tank 14 through valve 12 and pump 22, automatically priming the pump and driving any vapors which may be therein from the pump back into the tank 14.

Reference is now made to Figure 4, showing the adjustment of valve 12 when the pump is in normal operation, normal operation being considered to be such that the pump is operating within its capacity and without excessive back pressure. Since line 28 is connected to the pump outlet, the valve element 82 becomes unseated by liquid under pressure of the pump, requiring the liquid to take the path of least resistance, which is the pump discharge 30.

Should excessive back pressure be developed, and the excessiveness at which the valve responds may be varied, the main valve 70 will be opened due to this excessive pump pressure. Upon opening valve 70, as shown in Figure 5, the line 18 becomes a by-pass or return line for the excess liquid. The force of the spring 50 bearing on the main valve 70 is controllable by adjusting screw 56 as described previously. Therefore, the operational point at which the main valve 70 opens is regulatable from the exterior of valve 12. Main valve 70 will open an amount proportional to the excess pressure in the system. As soon as this excess pressure is relieved, the main valve 70 will again close, returning valve 12 to the position shown in Figure 4 until the pump is shut down.

Accordingly, the system will either be modulated or, depending on pump pressure, will cause the system to bypass the unwanted, excessive pressurized liquid. Line 18 will then be a feedback line. As pressure increases in the system, for example, assumed that there is a valve in the discharge line 30 and this valve is in the closed position, there will be no necessity for any manual adjustment, any pop-off or safety device of that nature. The automatic priming valve 12 will care for these problems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination function valve comprising a valve body having inlet and outlet openings for connection with the top vapor section of a petroleum bulk storage tank and the outlet opening of a sump, respectively, a valve chamber in said valve body in communication with said inlet and outlet openings, a valve bonnet secured to said valve body having a bore in registry with said chamber and said inlet, a valve seat on said inlet, an elongated main valve having a large piston on one end slidable in said bore and a smaller piston on the other end with a seating surface thereon engageable with said seat on said inlet, means yieldingly urging said main valve into engagement with said seat, said main valve having a longitudinal passage, a spring-loaded valve element operatively connected with said main valve and controlling the end of said longitudinal passage, said spring-loaded valve element being normally open and adapted to be closed by the liquid passing into said inlet, and a transverse passage extending through said main valve with said transverse passage in communication with said longitudinal passage and said outlet whereby said outlet will be in communication with said inlet when either said main valve or said valve element is in the open position and said outlet will be in constant communication with the portion of said bore receiving the end of said piston remote from said inlet and said main valve will be urged toward the open position in response to a given pressure differential between said inlet and said outlet independent of the pressure of the ambient atmosphere.

2. The combination of claim 1 including means for adjusting the force of said yielding means.

3. The combination of claim 2 wherein said yielding means comprises a compression spring being disposed between said large piston and the end of said bore remote from said main valve.

4. The combination of claim 3 including a movable seal in said bore against which the end of said spring remote from said main valve seats, said adjusting means comprising a threaded adjusting screw operable from the exterior of said bonnet and engageable with said seal to effect the movement of said seal through said bore.

5. A combination function valve comprising a valve body having inlet and outlet openings for connection with the top vapor section of a petroleum bulk storage tank and the outlet opening of a sump, respectively, a valve chamber in said valve body in communication with said inlet and outlet openings, a valve bonnet secured to said valve body having a bore in registry with said chamber and said inlet, a valve seat on said inlet, an elongated main valve having one end slidably received in said bore and a seating surface formed on the other end engageable with said seat on said inlet, means yieldably urging said main valve into engageemnt with said valve seat, said main valve having a longitudinal passage formed therethrough, a spring loaded valve element operatively connected with said main valve and controlling the end of said longitudinal passage adjacent said inlet, said spring loaded valve element being normally open and adapted to be closed by the liquid passing into the inlet, and a transverse passage extending through said main valve with said transverse passage in communication with said longitudinal passage and said outlet whereby said outlet will be in communication with said inlet when either said main valve or said valve element is in the open position and said outlet will be in constant communication with the portion of said bore receiving the end of said piston remote from said inlet and said main valve will be urged toward the open position in response to a given pressure differential between said inlet and said outlet independent of the pressure of the ambient atmosphere.

References Cited in the file of this patent

UNITED STATES PATENTS

| | | |
|---|---|---|
| 637,994 | Klay | Nov. 28, 1899 |
| 1,050,724 | Emory | Jan. 14, 1913 |
| 1,891,119 | Stover | Dec. 13, 1932 |
| 1,897,432 | Klotzman | Feb. 14, 1933 |
| 1,944,320 | Hesselman | Jan. 23, 1934 |
| 2,166,742 | Lambert | July 18, 1939 |
| 2,333,415 | DuBois | Nov. 2, 1943 |
| 2,375,810 | Nelson | May 15, 1945 |
| 2,394,672 | Dykeman | Feb. 12, 1946 |
| 2,442,361 | Hulman | June 1, 1948 |
| 2,625,108 | Logan | Jan. 13, 1953 |
| 2,634,947 | Gardner | Apr. 14, 1953 |
| 2,635,620 | Deardorff | Apr. 21, 1953 |
| 2,734,525 | Rausch | Feb. 14, 1956 |
| 2,737,974 | Renick | Mar. 13, 1956 |